United States Patent
Boyer, Jr.

(10) Patent No.: US 11,267,389 B2
(45) Date of Patent: *Mar. 8, 2022

(54) CARGO NET ANCHOR GUARD

(71) Applicant: William J. Boyer, Jr., Black Diamond, WA (US)

(72) Inventor: William J. Boyer, Jr., Black Diamond, WA (US)

(*) Notice: Subject to any disclaimer, the term of this patent is extended or adjusted under 35 U.S.C. 154(b) by 276 days.

This patent is subject to a terminal disclaimer.

(21) Appl. No.: 16/054,992

(22) Filed: Aug. 3, 2018

(65) Prior Publication Data
US 2019/0061598 A1    Feb. 28, 2019

Related U.S. Application Data

(63) Continuation of application No. 15/242,431, filed on Aug. 19, 2016, now Pat. No. 10,099,599.

(60) Provisional application No. 62/207,333, filed on Aug. 19, 2015.

(51) Int. Cl.
| | |
|---|---|
| *B60P 7/08* | (2006.01) |
| *E01F 15/14* | (2006.01) |
| *B65D 81/05* | (2006.01) |
| *E04F 19/02* | (2006.01) |

(52) U.S. Cl.
CPC .......... *B60P 7/0807* (2013.01); *B60P 7/0876* (2013.01); *B65D 81/053* (2013.01); *E01F 15/141* (2013.01); *E04F 19/028* (2013.01)

(58) Field of Classification Search
CPC .... B65D 81/053; B60P 7/0807; B60P 7/0876; E01F 15/141; E04F 19/028
See application file for complete search history.

(56) References Cited

U.S. PATENT DOCUMENTS

| | | |
|---|---|---|
| 4,113,110 A | 9/1978 | Mittag et al. |
| 5,369,925 A | 12/1994 | Vargo et al. |
| 6,036,155 A | 3/2000 | Tsui et al. |
| 6,588,717 B2 | 7/2003 | Carnahan et al. |
| 6,672,017 B2 * | 1/2004 | Larson ................ A47B 91/00 248/519 |
| D643,546 S | 8/2011 | Ringus et al. |
| 10,099,599 B2 * | 10/2018 | Boyer .................. B60P 7/0876 |
| 2016/0152171 A1 | 6/2016 | Boyer |

* cited by examiner

*Primary Examiner* — Yan Lan
(74) *Attorney, Agent, or Firm* — Perkins Coie LLP

(57) ABSTRACT

A cargo net anchor guard mountable to an aircraft's cargo hold wall adjacent to an anchor clip assemblies. The cargo net anchor guard is configured to block cargo from impacting at least the anchor clip assembly. The cargo net anchor guard has a ramped deflection surface that can deflect moving cargo inwardly away from the wall and into the cargo net substantially without impacting the anchor clip assembly.

10 Claims, 9 Drawing Sheets

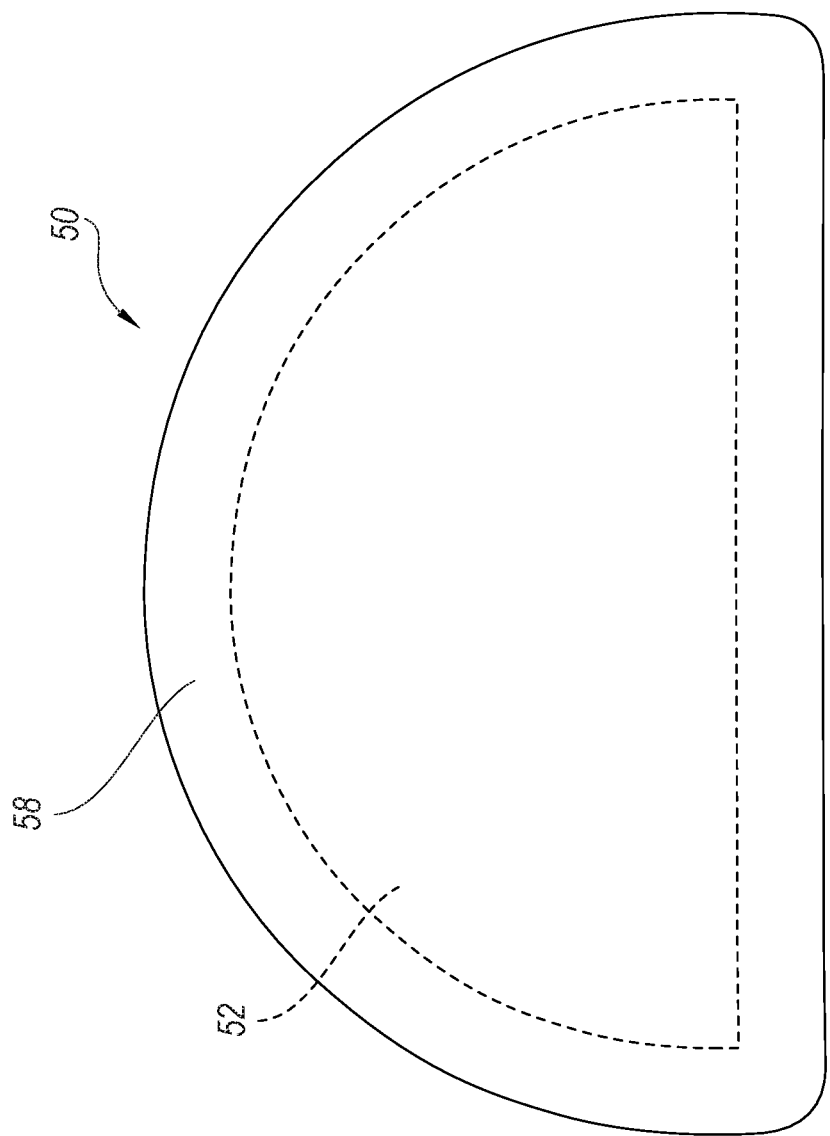

CARGO NET ANCHOR GUARD

CROSS-REFERENCE TO RELATED APPLICATION

This application is a continuation of U.S. patent application Ser. No. 15/242,431, titled Cargo Net Anchor Guard, filed Aug. 19, 2016, which claims the benefit of and priority to U.S. Provisional Patent Application No. 62/207,333, titled Cargo Net Anchor Guard, filed Aug. 19, 2015, all of which is incorporated herein in their entireties by reference thereto.

TECHNICAL FIELD

This patent application is directed to devices used with cargo net systems, including cargo net systems used in vehicles.

BACKGROUND

Cargo nets are often used in aircraft and other vehicles to restrict cargo from excess movement within a cargo area. For example, cargo nets are used in aircraft cargo holds to block cargo from moving into the area adjacent to the cargo doors, which could block or restrict movement of the cargo doors. The cargo nets can be used in other areas of a vehicle's cargo area. The cargo nets are typically releasably clipped onto anchor clip assemblies, which include at least a portion rigidly fixed to the structure of the vehicle, such as a wall, frame, or other structural portion. The anchor clip assemblies typically include an anchor base fixed to the vehicle, an anchor pin attached to the anchor base, and a retaining ring attached to the anchor pin, wherein a connector on the cargo net is attached to the retaining ring. The anchor clip assemblies project from the wall or other vehicle structure, and cargo in the vehicle's cargo area can shift and impact the anchor clip assembly, which can damage the anchor clip assembly and/or the cargo.

BRIEF DESCRIPTION OF THE DRAWINGS

Embodiments of the cargo net anchor guards introduced herein may be better understood by referring to the following Detailed Description in conjunction with the accompanying drawings, in which like reference numerals indicate identical or functionally similar elements.

FIG. 8 is a front elevation view of the cargo net anchor guard of FIG. 5.

FIG. 9 is a bottom plan view of the cargo net anchor guard of FIG. 5.

Figure 1:
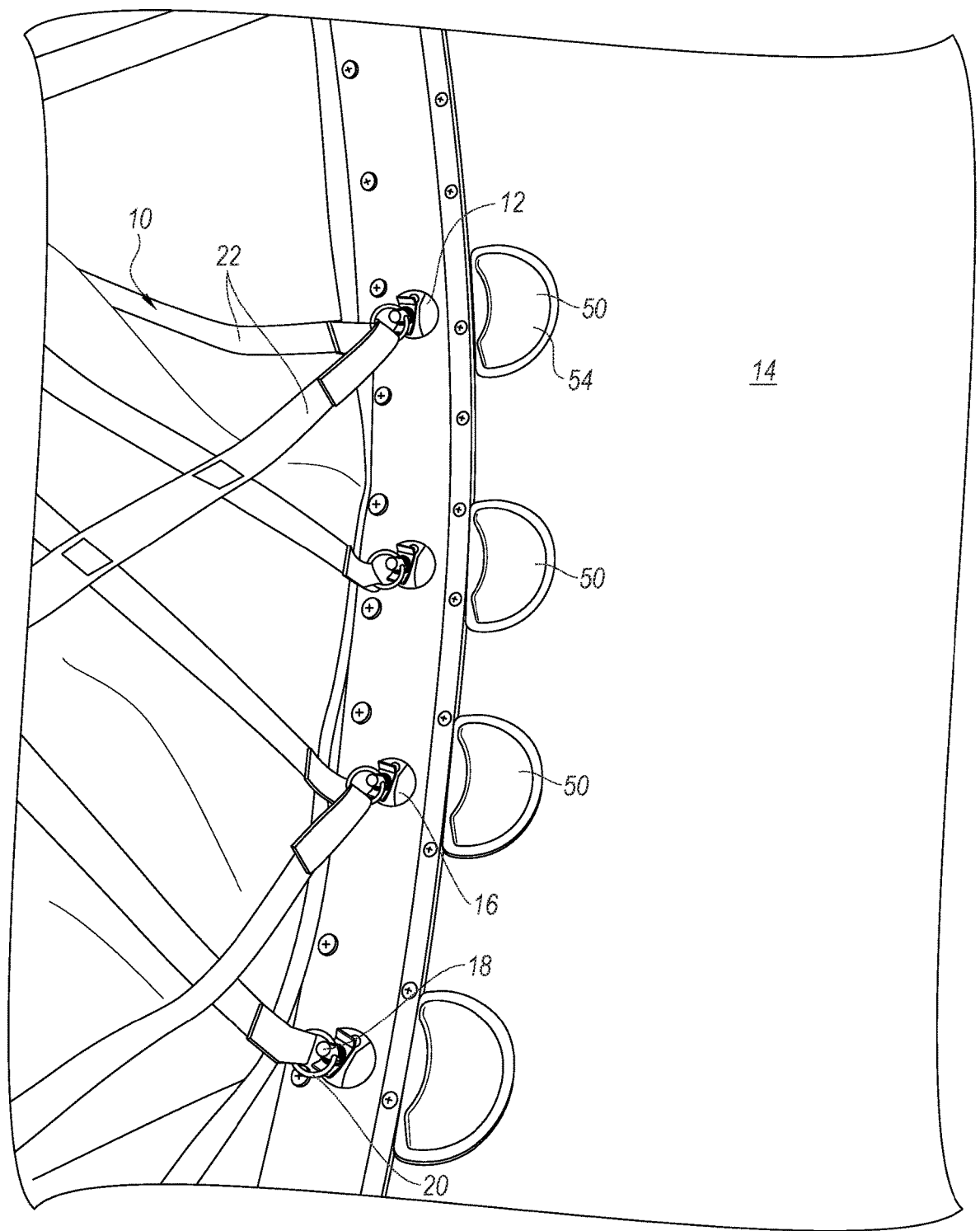
FIG. 1 is a partial perspective view of a vehicle cargo net and anchor clip assemblies fixed to the wall of an aircraft cargo hold, and cargo net anchor guards in accordance with aspects of the present technology attached to the wall adjacent to the anchor clip assemblies.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Cargo net anchor guards in accordance with one or more embodiments of the present technology will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

The anchor guards in accordance with the present disclosure overcome drawbacks experienced in the prior art and provide other benefits. One or more embodiments provides an anchor guard comprising a base having an engagement surface coupleable to the wall adjacent to the anchor clip. The base having a leading side facing the anchor clip and a curved trailing side facing away from the anchor clip. A contoured deflection member projects from the base. The deflection member has a front face extending away from the base substantially normal to the wall, and has a ramp portion with a sloped deflection surface extending from trailing side of the base to the front face. The deflection surface is configured to a deflect moving items away from the wall and the anchor clip to prevent damage to the anchor clip.

Another embodiment provides an anchor guard for use on a wall with a cargo anchor clip projecting from the wall. The anchor guard comprises a base attachable to the wall adjacent to the anchor clip. The base has a leading side facing the anchor clip and an contoured trailing side connected to and facing away from the leading side. A contoured deflection member is attached to and projects from the base. The deflection member has a front face extending away from the base and has a ramp portion with a sloped deflection surface extending from contoured trailing side of the base to the front face. The deflection surface is configured to a deflect moving items away from the wall and the anchor clip to prevent damage to the anchor clip.

In yet another embodiment, a cargo net anchor guard is provided for use in a vehicle cargo hold containing an cargo anchor clip projecting from a wall of the cargo hold. The cargo net anchor guard comprises a base having an arcuate engagement surface configured to mount to an arcuate portion of the wall of the cargo hold adjacent to the anchor clip. The base has a semicircular shape with a substantially straight side facing the anchor clip and a curved side facing away from the anchor clip. In one embodiment, the straight side can include a concave recess positionable adjacent to the anchor clip. A peripheral portion of the curved side defines a flange. A contoured deflection member projects from the base adjacent to the flange. The deflection member has a partially spherical deflection surface extending from the flange and attached to a front face positionable to face the cargo anchor clip. The front face extends away from the flange approximately normal to the wall between the flange and the deflection surface. The deflection surface defines a ramp relative to the cargo anchor clip configured to deflect moving cargo away from the wall and the cargo anchor clip to prevent damage to the cargo anchor clip.

FIG. 1 is a partial perspective view of a vehicle cargo net 10 and anchor clip assemblies 12 fixed to the wall 14 of an aircraft cargo hold. Cargo net anchor guards 50 in accordance with aspects of the present technology are attached to the wall 14 adjacent to the anchor clip assemblies 12. The aircraft wall 14 in the cargo hold typically has a curved surface due to the shape of the aircraft fuselage. Although the present disclosure describes embodiments of the current technology with respect to a cargo hold, a cargo net 10, and anchor clip assemblies 12 used in an aircraft, the present technology is configured for use in connection with other cargo restraining nets or the like usable on other vehicles, including land vehicles, space vehicles, and/or water vehicles. In the illustrated embodiment, the anchor clip assembly 12 is a conventional anchor clamp assembly, such as is available from a variety of manufacturers, including AmSafe, Inc.

The illustrated anchor clip assembly 12 projects away from the wall toward the cargo hold. The anchor clip assembly 12 has an anchor base 16 riveted or otherwise fastened to the aircraft's wall, a frame portion, a rib portion or other structural mounting portion in the cargo hold. An anchor pin 18 is attached to the anchor base 16, and a retaining ring 20 attached to the anchor pin 18. The retaining ring 20 is configured to attach to strapping 22 of a conventional cargo net 10. In the illustrated embodiment, the retaining ring 20 and the anchor pin 18 are configured to separate from the anchor base 16, such as when the cargo net is stowed or otherwise intentionally released from the aircraft wall 14. The anchor clip assemblies 12 project from the wall 14 or other vehicle structure. If the anchor clip assemblies 12 are not protected if or when cargo in the vehicle's cargo hold shifts, the moving cargo could impact one or more of the anchor clip assemblies 12, thereby damaging the anchor clip assembly 12 or the cargo.

Figure 2:
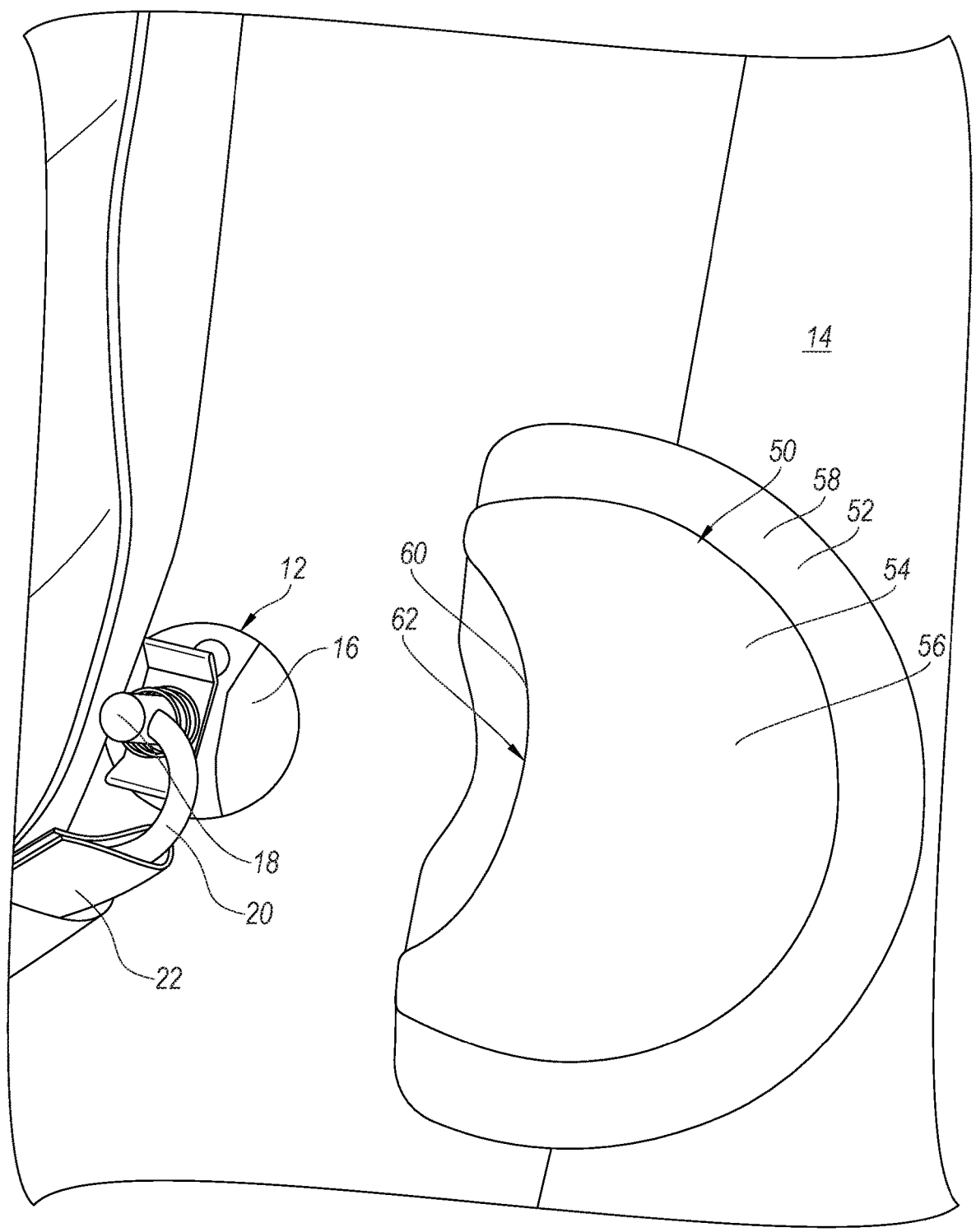
FIG. 2 is an enlarged perspective view of a cargo net anchor guard in accordance with an embodiment of the present technology adjacent to the anchor clip assembly.

FIG. 2 is a perspective view of a cargo net anchor guard 50 in accordance with an embodiment of the present technology. The cargo net anchor guard 50 is mounted to the aircraft's wall 14 in the cargo hold adjacent to a selected one of the anchor clip assemblies 12. The cargo net anchor guard 50 is configured to block cargo from impacting at least the anchor base 16 of the adjacent anchor clip assembly 12. The cargo net anchor guard 50 is also configured with a ramped deflection surface 56 that can deflect moving cargo inwardly away from the wall 14 and into the cargo net substantially without impacting the anchor base 16 and/or the anchor pin 18.

Figure 3:
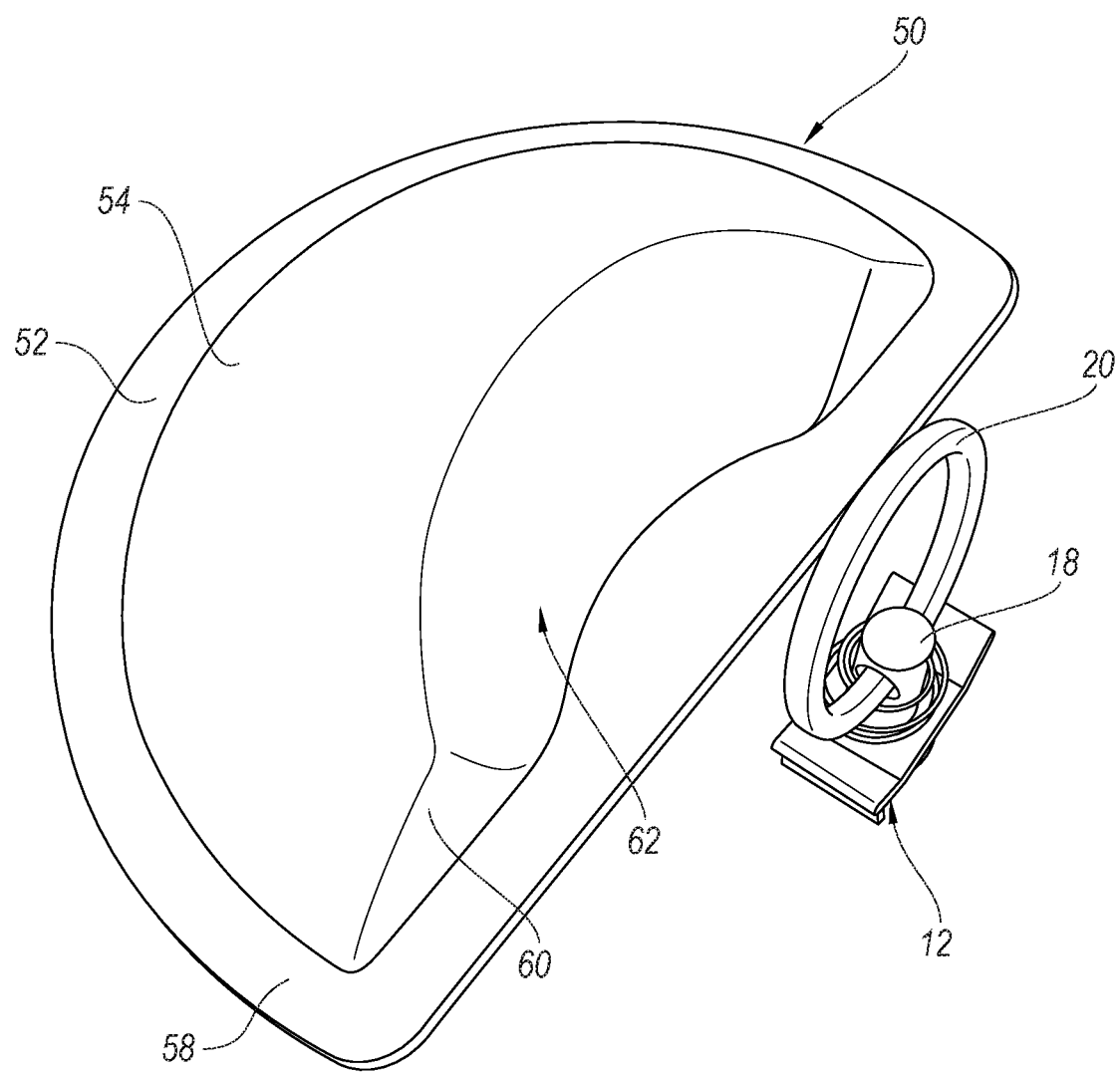
FIGS. 3 and 4 are top perspective views of the cargo net anchor guard in accordance with an aspect of the current technology shown adjacent to a portion of an anchor clip assembly.
Figure 4:
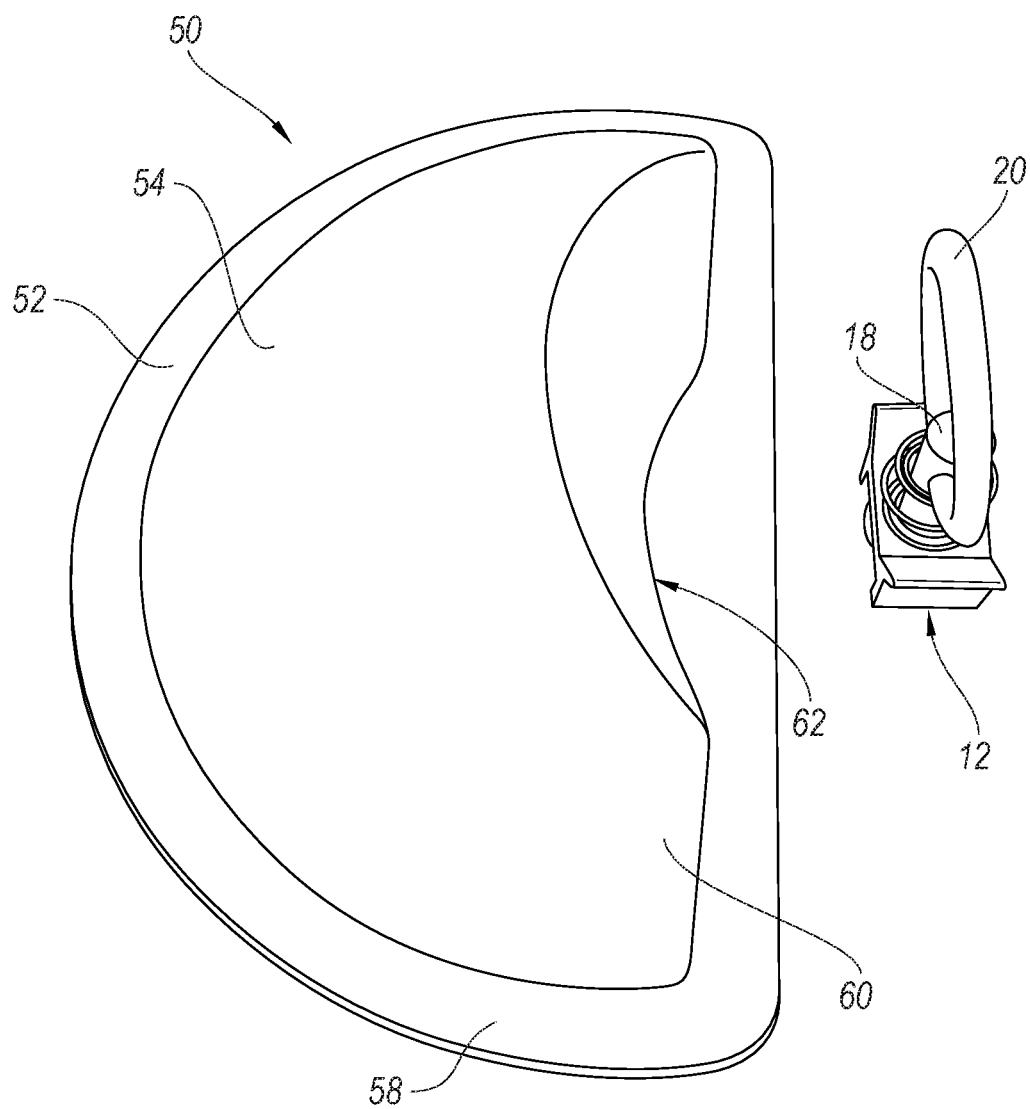
Figure 5:
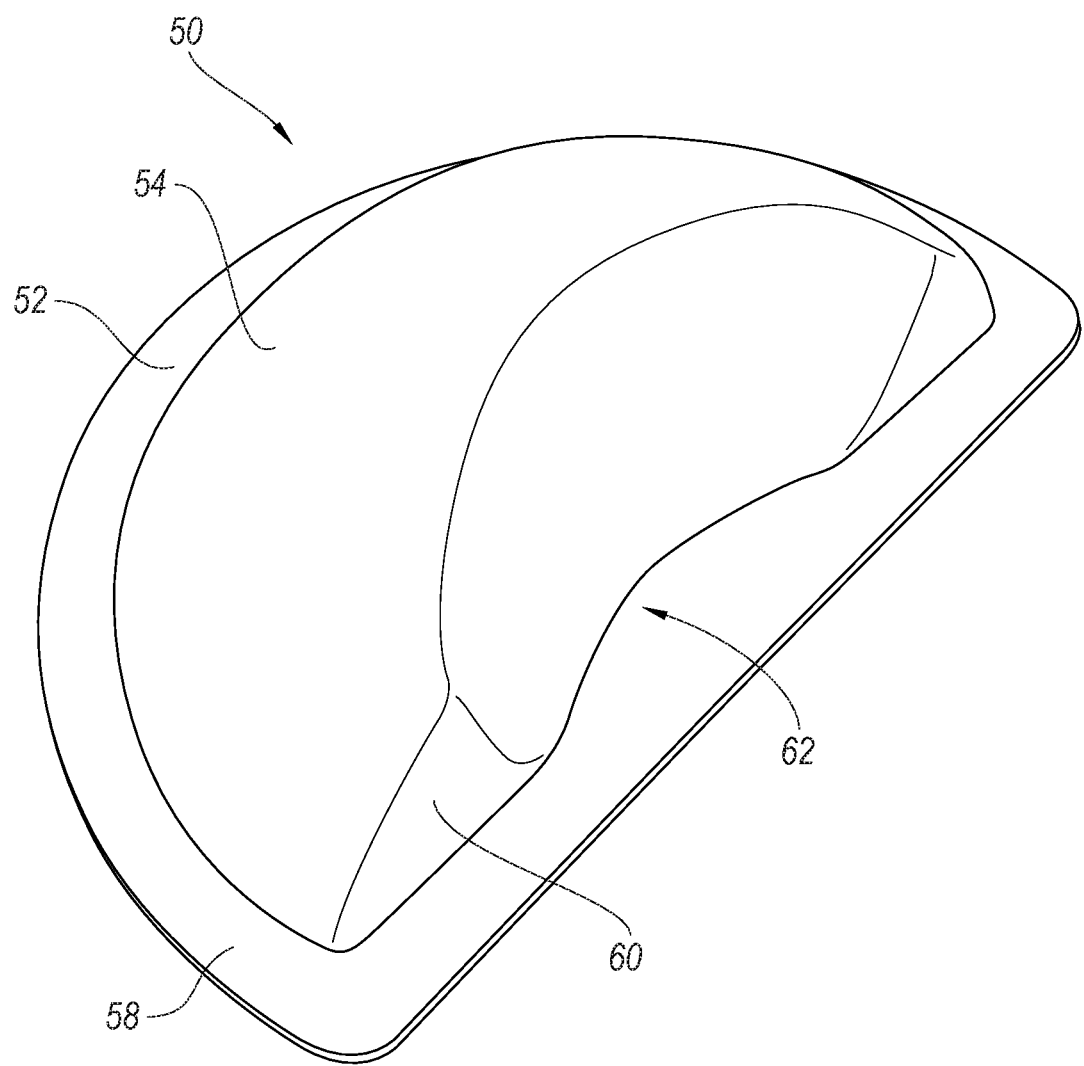
FIG. 5 is a top perspective view of the cargo net anchor guard of FIG. 3.
Figure 6:
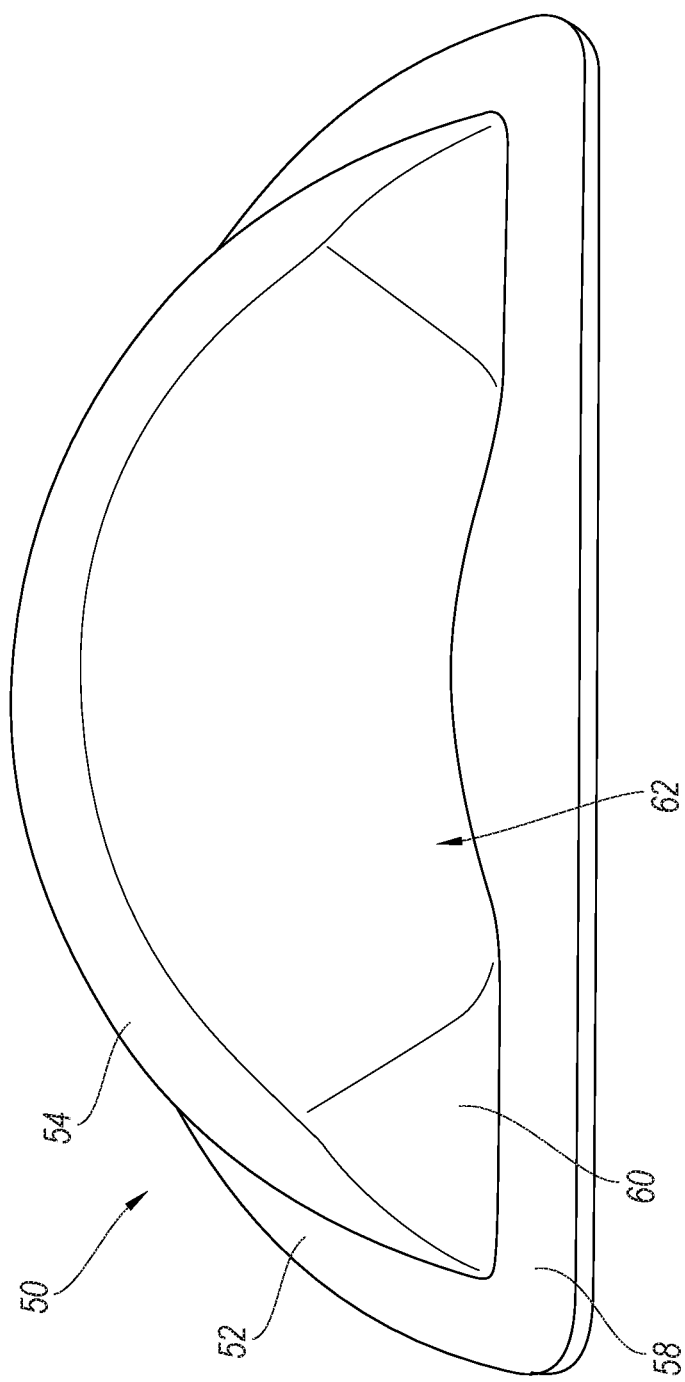
FIG. 6 is a front perspective view of the cargo net anchor guard of FIG. 5.
Figure 7:
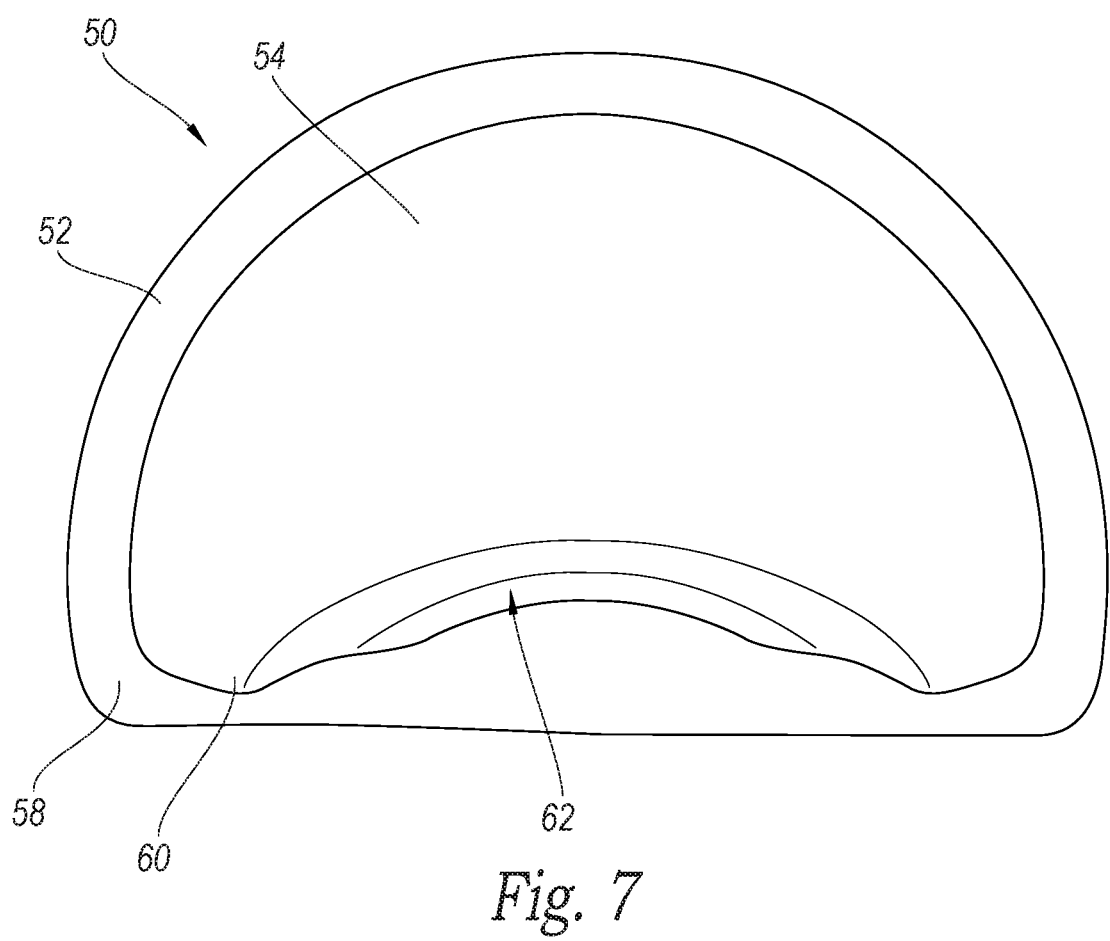
FIG. 7 is a top plan view of the cargo net anchor guard of FIG. 5.

FIGS. 3 and 4 are top perspective views of the cargo net anchor guard 50 in accordance with an aspect of the current technology shown adjacent to the retaining ring 20 and retaining pin 18 of a conventional anchor clip assembly 12. FIGS. 5-9 are perspective and/or elevation views of the cargo net anchor guard 50. The illustrated cargo net anchor guard 50 has a base 52 and a contoured deflection member 54 that defines the ramped deflection surface 56 projecting from the base 52. The base 52 of the illustrated embodiment is configured to attach to the aircraft's wall 14 (FIG. 2) adjacent to the anchor clip assembly 12. The base 52 has a semi-circular shape with the straight side facing the anchor clip assembly 12. The base 52 of the illustrated embodiment defines a flange 58 projecting outwardly from the deflection member 54. The edges of the base 52 can be tapered to minimize any flat edge surfaces (perpendicular to the aircraft wall 14) that could be hit by moving cargo. In another embodiment, a layer of cargo tape or other covering layer could be installed on the edges of the base 52 and the aircraft wall to provide a smooth transition between the aircraft wall 14 and the cargo net anchor guard 50. In other embodiments, the base 52 can have the same foot-print shape as the deflection member 54, such that the base does not extend outwardly from the deflection member 54.

The base 52 is configured to fixedly attach to the aircraft's wall 14 in the cargo hold (FIG. 2) adjacent to the anchor clip assembly 12. The base 52 can be attached to the wall 14 with a selected high-strength adhesive tape. Accordingly, the cargo-net anchor guards can be easily and quickly installed as a retrofit product or during initial aircraft manufacture. In other embodiments, the base 52 can be fixed to the wall 14 with a high-strength glue and/or with mechanical fasteners, such as rivets, screws, etc. As seen in FIG. 8, the base 52 has a slight arcuate shape configured to match the curved surface of the aircraft wall 14 in the cargo hold. The cargo net anchor guard 50 of the illustrated embodiment can be manufactured of a stiff, strong, flame retardant, thermoformable thermoplastic material certifiable under FAR 25.853 for aircraft cargo compartments. In other embodiments, other suitable materials can be used. The material may have sufficient flexibility that will allow the base to slightly flex to match the contour of the aircraft wall. As seen in FIG. 9, the base 52 in one embodiment is a unitary, slightly arcuate plate structure. The base in another embodiment can have a D-shape (as shown in phantom lines in FIG. 9), such that the base has an opening into an interior area of a hollow deflection member 54.

As seen in FIGS. 3-8, the deflection member 54 has a substantially quarter-spherical shape extending away from the base 52, such that the surface of the deflection member 54 is configured to deflect any cargo impacting the deflection member 54 away from the base 52 and the aircraft wall 14. Accordingly, the deflection member 54 will deflect the impacting cargo away from at least the anchor base 16 and/or the anchor pin 18. The partially spherical shape of the deflection member 54 provides strength and structural rigidity to resist substantively flexing or deforming upon impact by the cargo. In other embodiments, the deflection member 54 can have other shapes, such as a wedge shape, a partial pyramid shape, partial parabolic shape, or other arcuate or angled shape(s) that can deflect impacting cargo away from the anchor clip assembly 12. The deflection member 54 of the illustrated embodiment is a light weight, hollow structure, although the deflection member 54 of other embodiments can be substantially solid without a hollow interior area. The illustrated deflection member 54 is integrally connected to the base 52, although the deflection member 54 in other embodiments can be a separate, non-integral component attached to the base 52.

The deflection member 54 of the illustrated embodiment has a contoured front face 60 projection generally perpendicular to the base 52. The height of the front face 60 is greater than the height of at least the anchor pin 18 of the anchor base assembly to help ensure that any cargo impacting the cargo net anchor guard 50 will not physically impact the anchor pin or the anchor base before the cargo is deflected into the cargo net. The front face 60 of the illustrated embodiment has an inwardly arcuate portion 62 that faces toward the anchor clip assembly 12. The inwardly arcuate portion 62 defines an access area into which a user can fit a portion of his or her hand while accessing the associated anchor clip assembly. Accordingly, the cargo net anchor guard 50 is configured to not substantively interfere with operation of the anchor clip assembly, such as when the cargo net is being closed across the aircraft's cargo area or opened to allow access into the cargo area.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. An anchor guard for protecting an anchor clip projecting from a wall, comprising:
    a base having a pre-formed arcuate engagement surface, the base further having a leading side configured to face the anchor clip and a trailing side configured to face away from the anchor clip;
    an adhesive layer configured to attach the pre-formed arcuate engagement surface of the base to the wall; and
    a deflection member projecting from the base, the deflection member having a front face extending away from the base and having a ramp portion with a sloped deflection surface extending from the trailing side of the base to the front face, wherein the deflection surface is configured to deflect moving items away from the wall and the anchor clip to prevent damage to the anchor clip.

2. The anchor guard of claim 1, further comprising a flange projecting away from a periphery of the deflection member.

3. The anchor guard of claim 2, wherein the flange is tapered and narrows towards its peripheral edge immediately adjacent to the wall.

4. The anchor guard of claim 2, further comprising a covering layer over the flange to provide a smooth transition between the wall and the deflection member.

5. The anchor guard of claim 1, wherein the base has a semicircular shape.

6. The anchor guard of claim 1, wherein the deflection surface is at least partially rounded or spherical.

7. The anchor guard of claim 1, wherein the front face is an arcuate face defining a concave area into which a portion of the anchor clip can be positioned.

8. The anchor guard of claim 1, wherein the base is flexible to form to an arcuate surface of the wall.

9. The anchor guard of claim 1, wherein the trailing side is curved.

10. The anchor guard of claim 1, wherein the leading side of the base has a concave recess positionable adjacent to the anchor clip.

* * * * *